Oct. 14, 1958

R. HOTTIAUX 2,855,612

TANGENT CHASER SUPPORT MOUNTED ON LONGITUDINALLY
ADJUSTABLE PIVOT PIN

Filed Oct. 21, 1954

INVENTOR
ROLAND HOTTIAUX
By Linton and Linton
ATTORNEYS

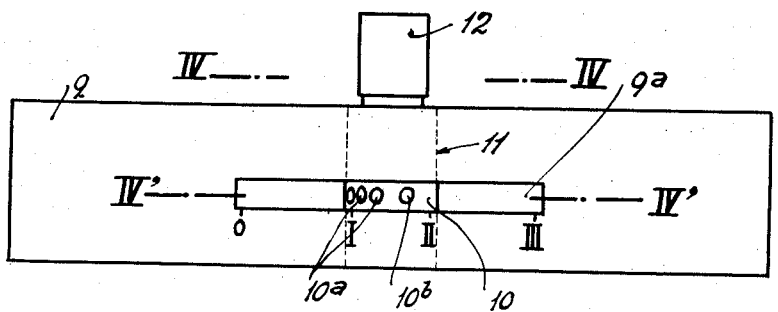
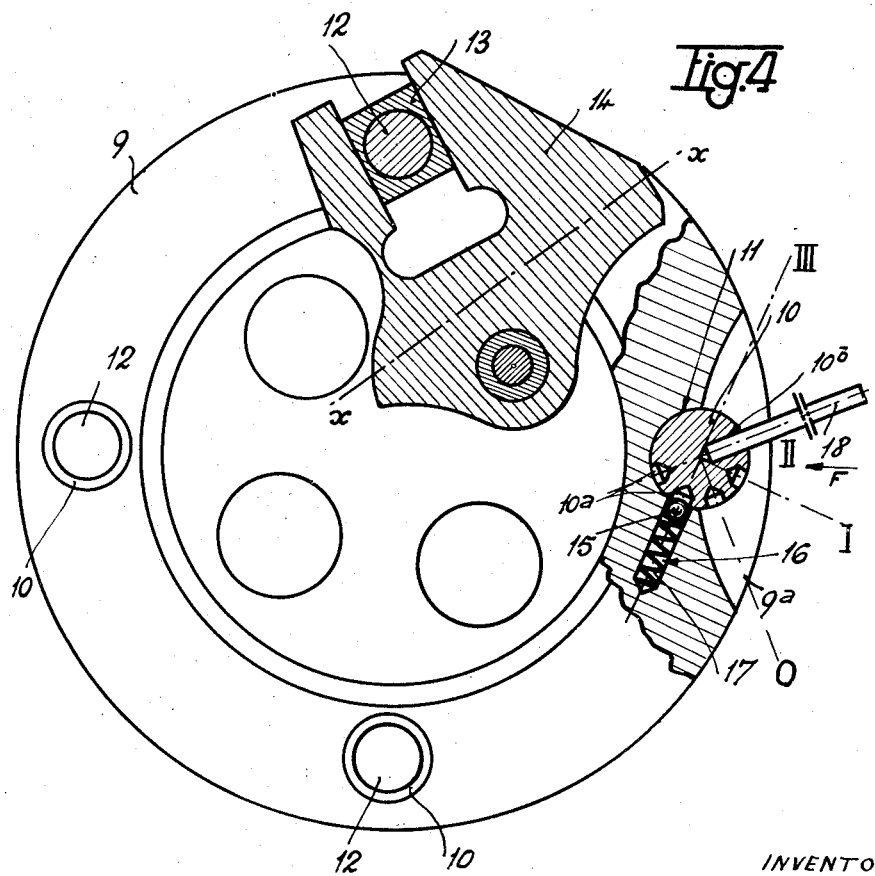

United States Patent Office 2,855,612
Patented Oct. 14, 1958

2,855,612

TANGENT CHASER SUPPORT MOUNTED ON LONGITUDINALLY ADJUSTABLE PIVOT PIN

Roland Hottiaux, Bogny, Braux, France

Application October 21, 1954, Serial No. 463,669

Claims priority, application France November 3, 1953

2 Claims. (Cl. 10—100)

My invention has for its object improvements in die-heads provided with tangent chasers, to be used on screw-cutting machines and more particularly, it relates to the manner of securing the chaser supports on their pivotal axes and also of adjusting the location of said chaser supports on the die-head.

It is a well-known fact that the securing of the chaser supports on the pivots forming the support thereof, often constitutes a defective feature in die-heads with tangent chasers of the conventional type. This securing is generally obtained by means of a screw passing through the chaser support and engaging the corresponding end of the pivot. Frequently, the operator who has dismantled the arrangement, tightens said screw insufficiently and the considerable stresses produced by the screw-cutting operation or the abnormal pressures arising through a poor fitting of the chaser, often lead, during operation, to an undesired release of the chaser support with reference to its spindle, which is a cause of unsatisfactory operation at the moment of the automatic opening of the chaser support, together with a dulling of the surface through which the chaser support rests on its pivot and also an abnormal wear of the bearing surface of the chaser support and of the upper surface of the head.

On the other hand, in all known prior arrangements, the adjustment of the chaser support in an axial direction is obtained by means of a knob screwed to the end of the pivot of the chaser support opposed to the latter and the locking of which is provided by a further screw. Such an arrangement constrains the operator, when changing the chaser supports or when adjusting them axially, to dismantle the die-heads of the machine so as to reach the above mentioned adjusting knob and the locking screw.

Furthermore, it has already been proposed, by Jules Casimir Hottiaux in his French Patent 642,085, filed on October 7, 1927 to cut out the defective concentricity of the chaser supports in a die-head, by means of an arrangement providing for the micrometric adjustment of the location of each of the chaser supports. This arrangement has, however, the drawback that it does not allow defining its position in a simple, speedy and reliable manner, that it requires the use of comparing means when it is desired to return to its starting conditions as obtained when the four chaser supports lie in a position for which the bearing surfaces of the chasers are equidistant from the center of the die-head and lastly, it requires a skilled operator for its operation.

The improvements according to my present invention are intended to remove the above disclosed drawbacks of such known arrangements. These improvements include the following features:

Each chaser support carried centrally on a cylindrical bearing provided at the corresponding end of its supporting pivot is fitted directly and unvaryingly on the latter by screwing over a preferably close-pitched thread so as to ensure a rigid securing to said pivot;

The pivot of each chaser support is provided throughout its length with a bore having two tappings of opposite pitches of which one is located in the section of the bore opposed to the chaser support and carries the knob adjusting the axial location of the chaser support while the other, which is nearer the chaser support, is engaged by a screw intended for the locking of said adjusting knob, said knob being provided at its inner end with a control slot or the like through which it may be screwed or unscrewed from the outside after removal of the locking screw;

The location of each chaser support on the die-head is adjusted by means of a pivot or spindle revolubly mounted in the die-head and including a very slightly eccentric section revolubly carried in the block which holds the chaser support in position, said pivot being further provided laterally with a series of juxtaposed recesses arranged on a same portion of its periphery and corresponding respectively to different adjusted angular positions of said pivot, while a ball or the like stop member held inside a bore of the die-head and submitted to the thrust of a spring engages selectively one of the said recesses;

Lastly, the above-mentioned adjusting pivot or spindle is provided with a lateral opening registering with a milled-off section of the die-head and wherein may be fitted a control pin which extends through the said milled-off section to provide for the rotation of the pivot.

I shall now describe in detail the manner of executing the above arrangements together with the advantages derived therefrom, reference being made to accompanying drawings given by way of example and by no means in a binding sense. In said drawings:

Fig. 3 is a partial elevational view of a die-head as seen in the direction of the arrow F of Fig. 4, the annular section of said die-head including means for adjusting the location of the chaser support as improved according to my arrangement;

Fig. 4 is a plan view of said angular section with parts shown cross-sectionally through lines IV—IV and IV'—IV' of Fig. 3.

Figure 1:
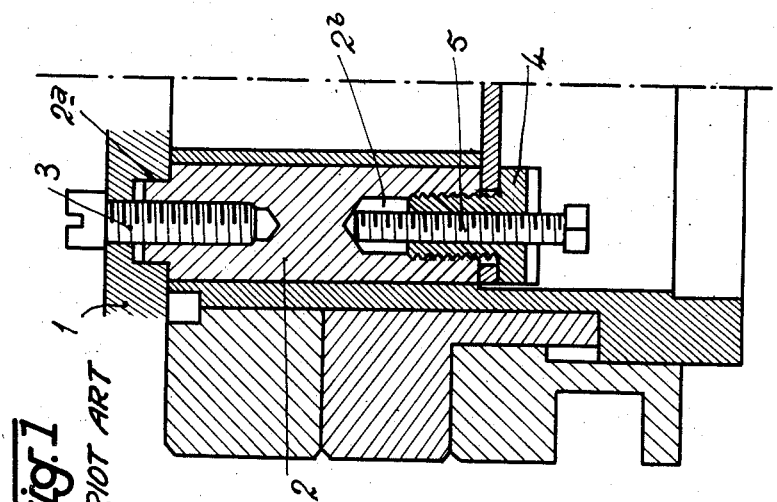
Fig. 1 is an axial cross-section of the known arrangement generally used up to now for securing and axially adjusting a chaser support of a die-head on its pivot.

As disclosed hereinabove, the securing of the chaser supports on their carrier pivots is conventionally obtained as illustrated in Fig. 1, wherein the chaser support shown partly at 1, is centrally carried by the cylindrical bearing 2a formed at one end of the pivot 2 to which the chaser support is secured by a screw 3. On the other hand, the location of the chaser support 1 in the axial direction is adjusted by means of a knob 4 screwed into the opposite end of the pivot 2 and which is locked in position by a screw 5 screwed into the said knob so as to bear against the bottom of a blind bore 2b formed in the pivot 2. The drawbacks of such arrangements have already been disclosed hereinabove and it is not necessary to enter into any further detail on the subject.

Figure 2:
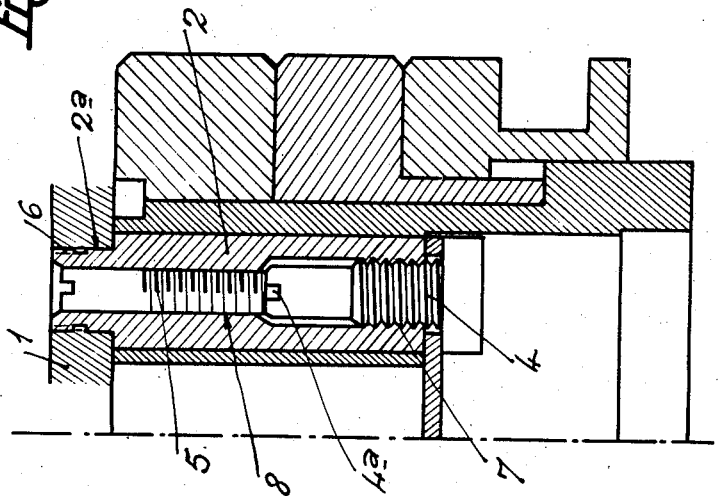
Fig. 2 is a similar cross-section of an embodiment of my improved arrangement providing for the securing and adjustment of the chaser support.

According to my invention, the chaser support is secured in the manner illustrated in Fig. 2 wherein the chaser support 1 centrally fitted over the cylindrical bearing 2a of the pivot 2 is fixedly locked on the latter through its screwing over the close pitched thread 6 formed at the end of said pivot. It is apparent that, through this mounting of the chaser support, the pivot becomes rigid with the chaser support, which ensures a very stiff assembly which does not require resorting to the judgment of the operator.

According to a further improvement provided by my invention, the pivot 2 is bored throughout its length and the bore thus formed is screw threaded at 7 and 8; the screw threadings thus obtained are of opposite directions and into them, I may screw on one hand axial adjusting knob 4 and on the other hand, screw 5 which ensures the locking of said knob. The inner end of the knob 4 is provided with a slot 4a into which may be inserted a screw-driver or the like so that the adjustment of said knob may be performed from the outside after removal of the locking screw 5. This arrangement thus permits dismantling or axially adjusting the chaser support without it being necessary to dismantle the die-head with reference to the machine.

Figs. 3 and 4 illustrate an embodiment of my improved arrangement, as provided for the micrometric adjustment of the position of each of the four chaser supports on the annular body of the die-head. In the said Figs. 3 and 4, 9 designates said annular body of the die-head which carries the four spindles or pivots 10 which serve for the said micrometric adjustment, only one of said pivots 10 being illustrated in Fig. 3 for sake of simplicity of the drawing. Each of said pivots 10 includes a cylindrical section guided inside a corresponding bearing 11 formed in the annular body 9 and a further likewise cylindrical section 12 which is slightly eccentric with reference to the first-mentioned section by say a few hundredths of a millimetre. This eccentric section 12 is revolubly carried inside the block 13 intended for the positioning of the corresponding chaser support 14 and it serves for driving said block whenever the pivot 10 is angularly shifted round the axis of its first section. Said section of the pivot 10 is provided with lateral recesses 10a which are suitably distributed over a section of its periphery and one of which may be selectively engaged by a ball 15 housed inside a bore 16 formed in the annular body of the die-head and urged by a spring 17 into engagement with the recess 10a facing the bore 16. The ball 15 defines thus as many angular positions 0, I, II, III . . . for the pivot or spindle 10 as there are recesses 10a in the latter. The spacing of said recesses 10a may be such e. g. that the above mentioned angular positions of the spindle or pivot 10 correspond on the chaser-support 14 to diametrical modifications of the position by 0—+0.02 mm.—+0.04 mm.—+0.06 mm. of the position of the bearing surface $x$—$x$ of the chaser. It is thus apparent that it is extremely easy for an operator to modify, through a suitable rotation of the pivot or spindle 10, the spacing of two chaser supports by successive increments of 0.02 mm. between 0 and 0.12 mm. without any dismantling and without any auxiliary aid of any kind being required, while it is always possible to return, in the case of a change of chaser, to the starting or zero position. The rotation of the pivot 10 may be obtained very simply by means of a pin 18 fitted inside an opening 10b formed in said pivot, said pin passing through a lateral milled-off section 9a formed in the annular body 9 in register with the location of said pivot.

What I claim is:

1. In a die head with tangent chasers for screw cutting machines, a mounting for tangent chaser supports comprising a plurality of tangent chaser supports, a plurality of pivots each having a tangent chaser support connected thereto and having a longitudinal bore therethrough, the bore of each of said pivots having a pair of screw threads provided each in an end portion thereof and with oppositely directed pitches, a plate mounted on said die head for supporting said pivots and having an opening corresponding to the position of each pivot, a plurality of adjusting knobs each having a threaded extension extending through one of said plates into the end of one of said pivot bores opposite to the connected chaser support and being in threaded engagement therewith, a plurality of screws each for locking one of said knobs extending into the opposite end of the bore of its respective pivot for engaging the end of the opposing knob extension and being in threaded engagement with said pivot bore, and the end of each knob extension having a control slot for permitting its being adjusted in said pivot bore by a tool therefore.

2. In a die head with tangent chasers for screw cutting machines, a mounting for tangent chaser supports comprising a carrier pivot for each tangent chaser slidably mounted for longitudinal movement on said die head and having a threaded cylindrical exterior bearing surface provided on one end portion thereof, a tangent chaser support for each pivot having a central threaded opening therethrough with said pivot threaded cylindrical end extending therein in threaded engagement therewith and said threads on said pivot and in said chaser support having a close pitch for fixedly locking said pivot and chaser support together, each pivot having a partially threaded bore extending longitudinally therethrough, means detachably and rotatably mounted on said die head and being in threaded engagement with said pivot bore threads for adjustably positioning said pivot through longitudinal movement thereof upon rotation of said means, said means having an end within said bore of a configuration for receiving and being rotated by a tool extending within said bore from the exteriorly threaded end of said pivot.

References Cited in the file of this patent

UNITED STATES PATENTS

| 1,017,887 | Landis | Feb. 20, 1912 |
| 1,296,546 | Miller | Mar. 4, 1919 |
| 2,232,854 | Hogg | Feb. 25, 1941 |
| 2,479,075 | Martin | Aug. 16, 1949 |

FOREIGN PATENTS

| 402,887 | Great Britain | Dec. 14, 1933 |